(12) United States Patent
Mizutani

(10) Patent No.: US 8,838,305 B2
(45) Date of Patent: *Sep. 16, 2014

(54) BOAT INCLUDING STEERING LOAD CONTROL

(75) Inventor: Makoto Mizutani, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1025 days.

This patent is subject to a terminal disclaimer.

(21) Appl. No.: 12/431,873

(22) Filed: Apr. 29, 2009

(65) Prior Publication Data

US 2010/0114412 A1  May 6, 2010

(30) Foreign Application Priority Data

Dec. 18, 2007  (JP) ................................. 2007-325372

(51) Int. Cl.

| | |
|---|---|
| *B60L 15/00* | (2006.01) |
| *B60L 15/20* | (2006.01) |
| *B63H 20/12* | (2006.01) |
| *B60L 15/36* | (2006.01) |
| *B60W 20/00* | (2006.01) |
| *B63J 3/00* | (2006.01) |

(52) U.S. Cl.
CPC ............. *B63H 20/12* (2013.01); *B60L 2200/32* (2013.01); *B63J 2003/002* (2013.01); *B60L 2260/54* (2013.01); *B60L 15/2045* (2013.01); *B60L 15/36* (2013.01); *B60W 20/50* (2013.01)
USPC ............................................. 701/21; 701/22

(58) Field of Classification Search
CPC ......... B60L 15/00; B60L 15/10; B60L 15/20; B60L 15/2045; B60L 15/32; B60L 15/34; B60L 15/36; B60L 15/38; B60L 2200/32; B60L 2260/54; B63H 20/00; B63H 21/17; B63H 23/24; F02B 61/045; H02J 7/0031; H02J 7/0057; H02J 7/0068; H02J 9/002; B60W 20/50; H02P 29/02
USPC ........ 701/21, 22, 36, 41; 440/1, 6, 53–65, 87; 318/139

See application file for complete search history.

(56) References Cited

U.S. PATENT DOCUMENTS

| | | | | |
|---|---|---|---|---|
| 4,837,690 | A | * | 6/1989 | Morishita et al. ................ 701/43 |
| 5,886,418 | A | * | 3/1999 | Kondo et al. .................. 307/9.1 |
| 8,011,981 | B2 | | 9/2011 | Mizutani |
| 2003/0109184 | A1 | * | 6/2003 | Kanno .............................. 440/1 |
| 2005/0170708 | A1 | * | 8/2005 | Okuyama ......................... 440/1 |

FOREIGN PATENT DOCUMENTS

JP          2959044 B2    10/1999

* cited by examiner

*Primary Examiner* — Jerrah Edwards
(74) *Attorney, Agent, or Firm* — Keating & Bennett, LLP

(57) ABSTRACT

A boat that allows effective steering even when the motor output power is decreased due to the low battery charge includes a first predictive determination unit arranged to compare an actual charge amount of a battery supplying an electric power to a steering motor or a predicted charge amount of the battery calculated from a predicted working current with a threshold predetermined in relation to running states; a steering load detector arranged to calculate a required output value of a steering motor necessary to steer an outboard motor while the boat is under way; and a steering load controller arranged to control the required output value to be decreased from the present output value when the first predictive determination unit determines that the threshold is larger than the battery charge amount.

12 Claims, 6 Drawing Sheets

BOAT INCLUDING STEERING LOAD CONTROL

BACKGROUND OF THE INVENTION

1. Field of the Invention

The present invention relates to a boat equipped with an electronic steering device that steers a boat propulsion device such as an outboard motor according to electrical signals coming from an operator's seat side.

2. Description of the Related Art

One of the conventional types of such boats is the one described in JP-B-2959044, in which a boat propulsion device (an outboard motor) having an internal combustion engine and a propeller to move a boat is provided outside of the hull, a steering motor is provided in the connecting area of the hull and the outboard motor for rotating the outboard motor in a horizontal direction, and the steering motor is connected with a steering system representing a boat propulsion device operating unit and provided at the operator's seat, by signal cables (electric wires) capable of sending and receiving the signals. The steering system is provided with a rotational angle sensor. The steering motor rotates to steer the outboard motor based on the rotational direction and the rotational angle of the steering system detected by the rotational angle sensor.

However, in the case of the invention described in JP-B-2959044, there is a possibility of incomplete steering when an output power of the steering motor that performs the steering operation becomes smaller than a steering load due to the low battery charge. Thus, it is desired to provide a control that allows for an effective steering operation.

Besides, in the case of a multiple installation boat in which plural outboard motors are mounted, the steering load is different between the right and the left outboard motors when the boat makes a turn. Also, the steering load changes according to the type of boat on which the outboard motor is mounted, and the running states. In the boat steering device of JP-B-2959044 or in another conventional boat steering device, electric power is generated independently by each boat propulsion device and used to supply power to an auxiliary engine, PTT (power trim and tilt system), an engine starter, and a steering system. However, there is a concern that the electric power to carry out the steering may be insufficient so as to cause response delay under certain conditions such as a heavily loaded boat, a trim-in condition, a high-speed operation, and a sharp turn. Also, there is a concern of cranking failure due to the low battery voltage.

SUMMARY OF THE INVENTION

In order to overcome the problems described above, preferred embodiments of the present invention provide a boat that allows for effective steering even when the motor output power is decreased due to a low battery charge.

According to a preferred embodiment of the present invention, a boat includes a boat propulsion device rotatably disposed on the hull; a boat propulsion device operating unit provided on the hull and steered by a operator; a steering motor arranged to steer the boat propulsion device according to the steering operation of the boat propulsion device operating unit; and signal cables arranged to electrically connect the steering motor with the boat propulsion device operating unit, wherein the boat includes a first predictive determination unit arranged to compare an actual charge amount of a battery supplying an electric power to the steering motor or a predicted charge amount of the battery calculated from a predicted working current, with a threshold predetermined in relation to running states; a steering load detector arranged to calculate a required output value of a steering motor necessary to steer the boat propulsion device while the boat is under way; and a steering load controller arranged to control the required output value to be lower than the present output value when the first predictive determination unit determines that the threshold is larger than the battery charge amount.

The boat also may preferably include a motor output power detector arranged to detect an output capability value that the steering motor can generate; a second predictive determination unit arranged to compare the required output value from the steering load detector with the output capability value from the motor output power detector; and a load power controller arranged to perform control to increase the battery charge amount and/or to reduce the load power, when the second predictive determination unit determines that the required output value is larger than the output capability value.

The steering load detector preferably is arranged to calculate the required output value based on at least any one of a boat running state, a steering state, a state of the boat propulsion device, and a driving state of the steering motor.

The boat preferably includes a battery arranged to supply the electric power to the steering motor. The motor output power detector is configured to detect the output capability value based on at least anyone of the states of a battery voltage, a battery current, a temperature of the steering motor, a failure state of the steering motor, and the number of the boat propulsion devices being driven.

The steering load controller is preferably arranged to perform control so as to reduce the required output value from the present output value by controlling at least any one of a trim angle, an engine speed, a steering angle, a steering reaction force, and the steering motor driving current.

The load power controller is preferably arranged to control at least any one of the number of the boat propulsion devices that are being engine driven, driving of the trim, driving of an engine starter, the engine speed, the number of batteries connected, and the number of generators driven, to increase the output capability value by increasing the electric power supplied to the steering motor.

The load power controller is preferably configured to perform control for increasing the output capability value by reducing the load power of electric apparatus except for the electric power used for the steering control and increasing the electric power supplied to the steering motor.

According to a preferred embodiment of the present invention, sufficient motor output power can be secured and good steering control can be achieved while continuously securing the propulsion force by performing the control via the steering load controller when the battery charging amount becomes smaller than the threshold.

In addition, the required output value (the steering load) detected by the steering load detector is preferably compared with the output capability value detected by the motor output power detector. Thus, when the output capability value to carry out the steering is smaller than the steering load due to the low battery charge amount or other contributing factors, sufficient motor output power can be secured and good steering control can be achieved while continuously securing the propulsion force by performing the control via the load power controller.

According to a preferred embodiment of the present invention, the steering load can be detected more appropriately, since the steering load detector is configured to calculate the required output value based on at least any one of the boat running state, the steering state, the state of the boat propulsion device, and the driving state of the steering motor.

According to a preferred embodiment of the present invention, the motor output power can be detected more appropriately, since the motor output power detector is configured to detect the output capability value based on at least any one of the states of the battery voltage, the battery current, the temperature of the steering motor, the failure state of the steering motor, and the number of boat propulsion devices being driven.

According to a preferred embodiment of the present invention, the motor output power can be secured more appropriately and good steering control can be achieved while continuously securing the propulsion force, since the steering load controller is configured to perform control for reducing the required output value to be lower than the present output value by controlling at least any one of the trim angle, the engine speed, the steering angle, the steering reaction force, and the steering motor driving current.

According to a preferred embodiment of the present invention, the motor output power can be secured more appropriately and good steering control can be achieved while continuously securing the propulsion force, since the load power controller is configured to perform control so as to increase the electric power supply to the steering motor from the present output value and increase the output capability value, by controlling at least any one of the number of boat propulsion device engines driven, the driving of the trim, the driving of the engine starter, the engine speed, the number of batteries connected, and the number of generators driven.

According to a preferred embodiment of the present invention, the motor output power can be secured more appropriately and good steering control can be achieved while continuously securing the propulsion force, since the load power controller is configured to perform control so as to increase the output capability value by reducing the load power of electric apparatus except for the electric power used for the steering control, and increasing the electric power supplied to the steering motor.

Other features, elements, arrangements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
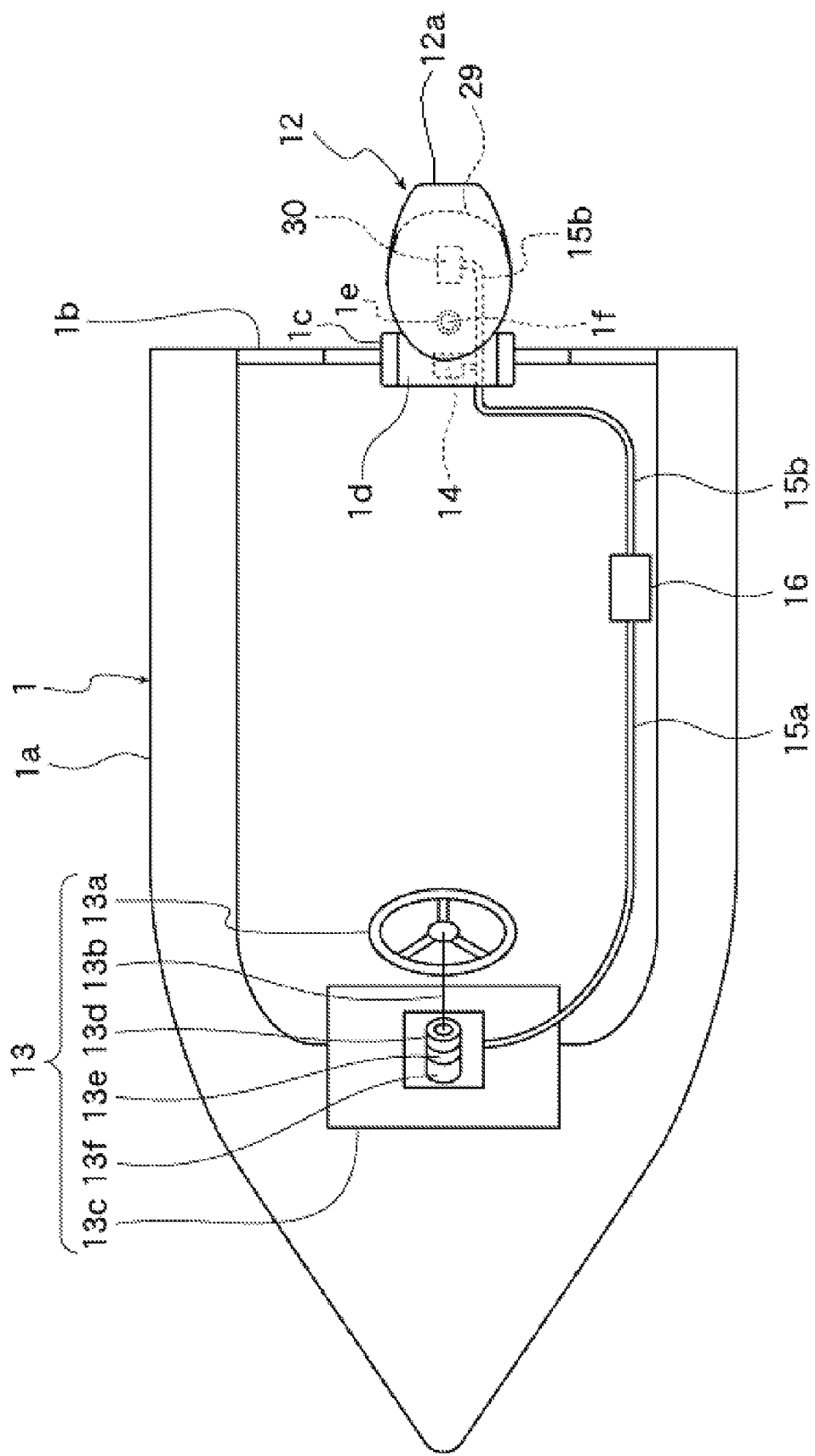
FIG. 1 is a schematic top plan view of a boat according to a first preferred embodiment of the present invention.

Now, preferred embodiments of the present invention will be described below with reference to the drawings.

First Preferred Embodiment

FIGS. 1 through 5 show a first preferred embodiment according to the present invention.

Starting with the description of structure, a boat 1 according to the first preferred embodiment of the present invention includes an outboard motor 12 representing a "boat propulsion device" at the stern of a hull 1a, and has a structure in which a steering motor 14 steers the outboard motor 12 when a steering system 13 representing a "boat propulsion device operating unit" is steered by an operator. The steering motor 14 and the steering system 13 are electrically connected by signal cables 15a, 15b, and a steering controller 16 is disposed between the signal cables 15a, 15b to have a configuration that the steering motor 14 is controlled by the steering controller 16.

The outboard motor 12 provides a propulsion force to the boat 1 via a propeller 27, and also changes the traveling direction of the boat 1. A tab-trim 28 is provided on the outboard motor 12.

An outboard motor body 12a of the outboard motor 12 houses an engine 29 that is driven for rotation, and is mounted to a transom plate 1b which constitutes the rear end of the hull 1a, via a clamp bracket 1c and a swivel bracket 1d attached to the clamp bracket 1c. The swivel bracket 1d includes a swivel bearing 1e extending vertically relative to the paper surface of FIG. 1. The outboard motor body 12a is equipped with a swivel shaft 1f supported by the swivel bearing 1e to allow free rotation. A rotating mechanism (now shown) is connected to the swivel shaft 1f. The outboard motor 12 is configured to be steered by the rotating mechanism driven by the steering motor 14.

The steering system 13 is provided in front of the operator's seat on the hull 1a. An end portion of a steering shaft 13b is joined to the center of a steering wheel 13a of the steering system 13, while a foot portion of the steering shaft 13b is inserted into a steering control unit 13c to be supported rotationally. Within the steering control unit 13c, a rotation sensor 13d arranged to detect the rotational speed and the rotating direction of the steering shaft 13b, an angular sensor 13e arranged to detect the steering angle of the steering shaft 13b, a portion of a steering load detector 20 arranged to detect the steering direction, the operating angle and the operating speed of the steering wheel 13a, and an anti-torque motor 13f arranged to add a resistance to the steering wheel 13a are provided.

The steering control unit 13c is connected to the steering controller 16 by way of the signal cable 15a, and the steering controller 16 is connected to an outboard motor-mounted controller 30 provided in the outboard motor body 12a by way of the signal cable 15b. Note that the steering controller 16 may be provided close to the steering system 13, or close to the outboard motor-mounted controller 30.

Figure 2:
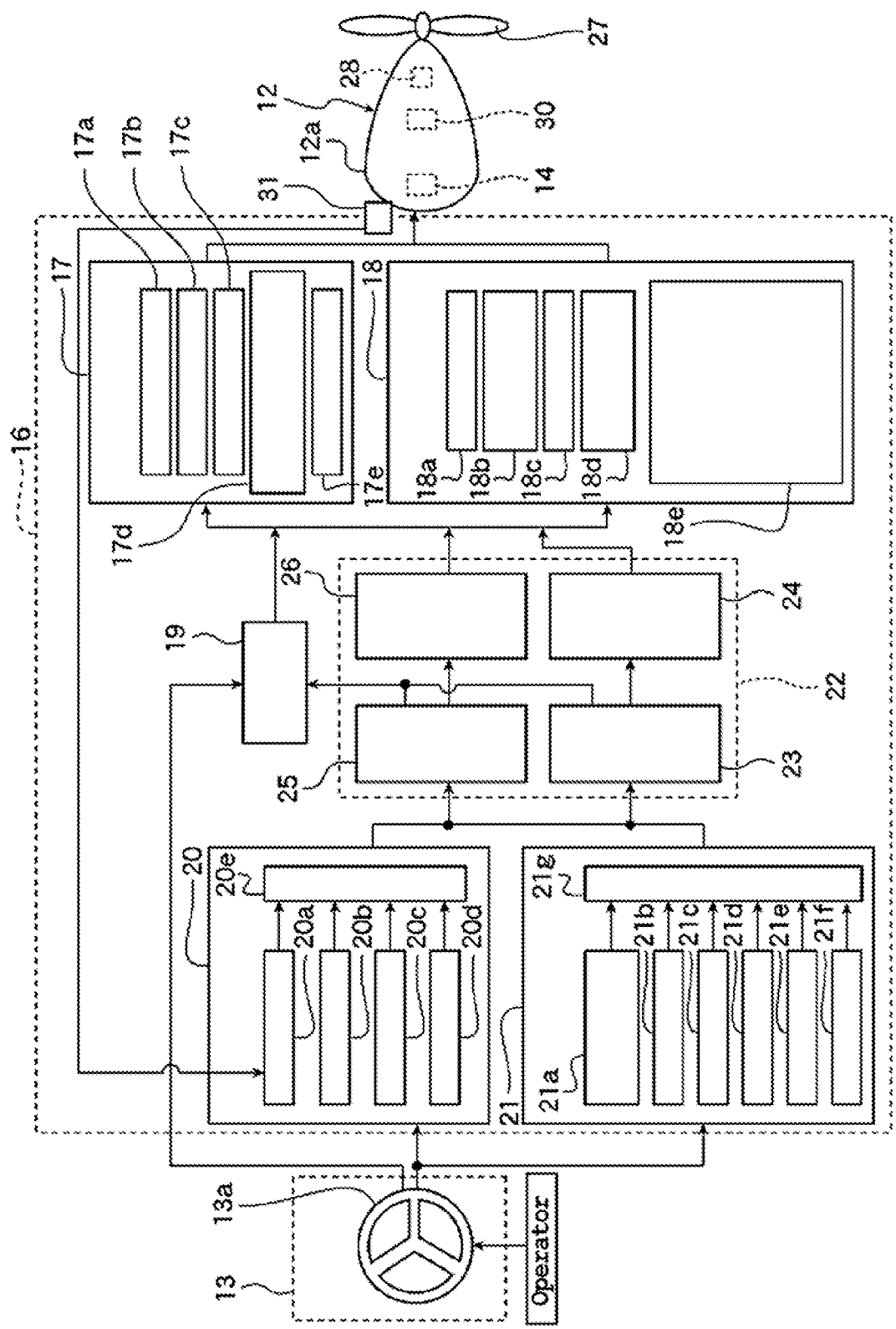
FIG. 2 is a functional block diagram according to the first preferred embodiment of the present invention.

The steering controller 16 is configured to control various kinds of apparatuses according to the implemented program. As shown in FIG. 2, the steering controller 16 has a load power controller 17, a steering load controller 18, a normal steering drive controller 19, a steering load detector 20, a motor output power detector 21, and an emergency controller 22. The emergency controller 22 includes an output predictive determination unit 23 (hereinafter referred to as a second predictive determination unit), an output emergency controller 24 (hereinafter referred to as a second emergency controller), a charge amount predictive determination unit 25 (hereinafter referred to as a first predictive determination unit), and a charge amount emergency controller 26 (hereinafter referred to as a first emergency controller).

The steering load detector 20 is configured to calculate the output value required for the steering motor 14 to steer the outboard motor 12 while the boat is in a running state, while the motor output power detector 21 is configured to detect the output capability value that the steering motor 14 can generate in the relevant running state of the boat.

The value of output capacity is calculated mainly based on a battery charge amount, and taking account of a reduced amount of output power from the steering motor 14. The battery charge amount is detected based on a battery voltage. The reduction of output power from the steering motor 14 is caused by the temperature of the steering motor 14, deterioration due to the operation of the steering motor 14 for an extended period of time, and so on, and the amount of reduced output power of the steering motor 14 is calculated by digitizing the effects of the aforementioned factors.

The second predictive determination unit 23 is configured to compare the required output value provided by the relevant steering load detector 20 with the output capability value provided by the motor output power detector 21.

The load power controller 17 is configured to control in a manner that, when the second predictive determination unit 23 determines that the required output value is larger than the output capability value, the electric power supplied to the steering motor 14 is increased from the current output value to achieve a larger output capability value (to secure the sufficient electric power).

Also, the steering load controller 18 is configured to perform control such that, when the second predictive determination unit 23 determines that the required output value is larger than the output capability value, the required output value is decreased from the present output value.

Further, the first predictive determination unit 25 is configured to compare the actual charge amount of the battery supplying the electric power to the steering motor 14 with the threshold predetermined according to the running states.

Note that the actual charge amount of the battery may be replaced with a predicted battery charge amount calculated from the predicted working current when comparing with the threshold. Specifically, to determine the predicted working current, the required output is calculated based on the running states (engine speed, running speed of the boat, etc.), and the result is used to calculate the required current. Then, the remaining amount of battery charge (predicted battery charge amount) after a given period of time is calculated. Alternatively, the remaining amount of battery charge after a given period of time may be calculated based on the changes in the battery charge amount (voltage change in a given period of time, and so on).

The load power controller 17 is configured to perform control such that, when the first predictive determination unit 25 determines that the threshold is larger than the battery charge amount, the electric power supplied to the steering motor 14 is increased from the present output value to achieve a larger output capability value.

Also, the steering load controller 18 is configured to control in a manner that, when the first predictive determination unit 25 determines that the threshold is larger than the battery charge amount, the required output value is decreased from the current output value.

The load power controller 17 is arranged to control the electric power supply to the steering motor 14 by an electric power control section 17a for the steering motor 14, to control the electric power supply to an engine starter (not shown) by an electric power control section 17b for the engine starter (not shown), to control the electric power supply to a trimming device by an electric power control section 17c for the trimming device, to control the amount of power generation by an engine driven generator (not shown) by an electric power control section 17d for the engine driven generator (not shown), and to control the load power of various other electric apparatus by an other load power control section 17e. In the case of a multiple outboard motor installation, the electric power control for the engine starter can limit the number of outboard motors on which the engine starter is allowed to be driven for decreasing the electric power consumption.

The steering load controller 18 is arranged to control the factors influencing the magnitude of the steering load (the required output value), which controls the steering load of the outboard motor 12 by taking respective measures including various controls such as trimming-up by a trimming control section 18a, reducing the running speed and the engine speed by a boat running speed and engine speed control section 18b, limiting the steering angle and increasing the reaction force by a steering angle limitation and reaction force control section 18c, and lowering the response level and changing the gain by a response level and gain control section 18d; and correction of warning mismatch such as the transom height adjustment, after-market anti-cavitation plate change, tab-trim setting and so on by using a warning mismatch correction section 18e, when the steering load is to be reduced (see FIG. 2). Note that the warning mismatch correction section 18e can reduce the steering load (the required output value) by notifying an operator to adjust the transom height, to change the after-market anti-cavitation plate, or to adjust the tab-trim setting, when a need for reducing the steering load arises.

Figure 3:
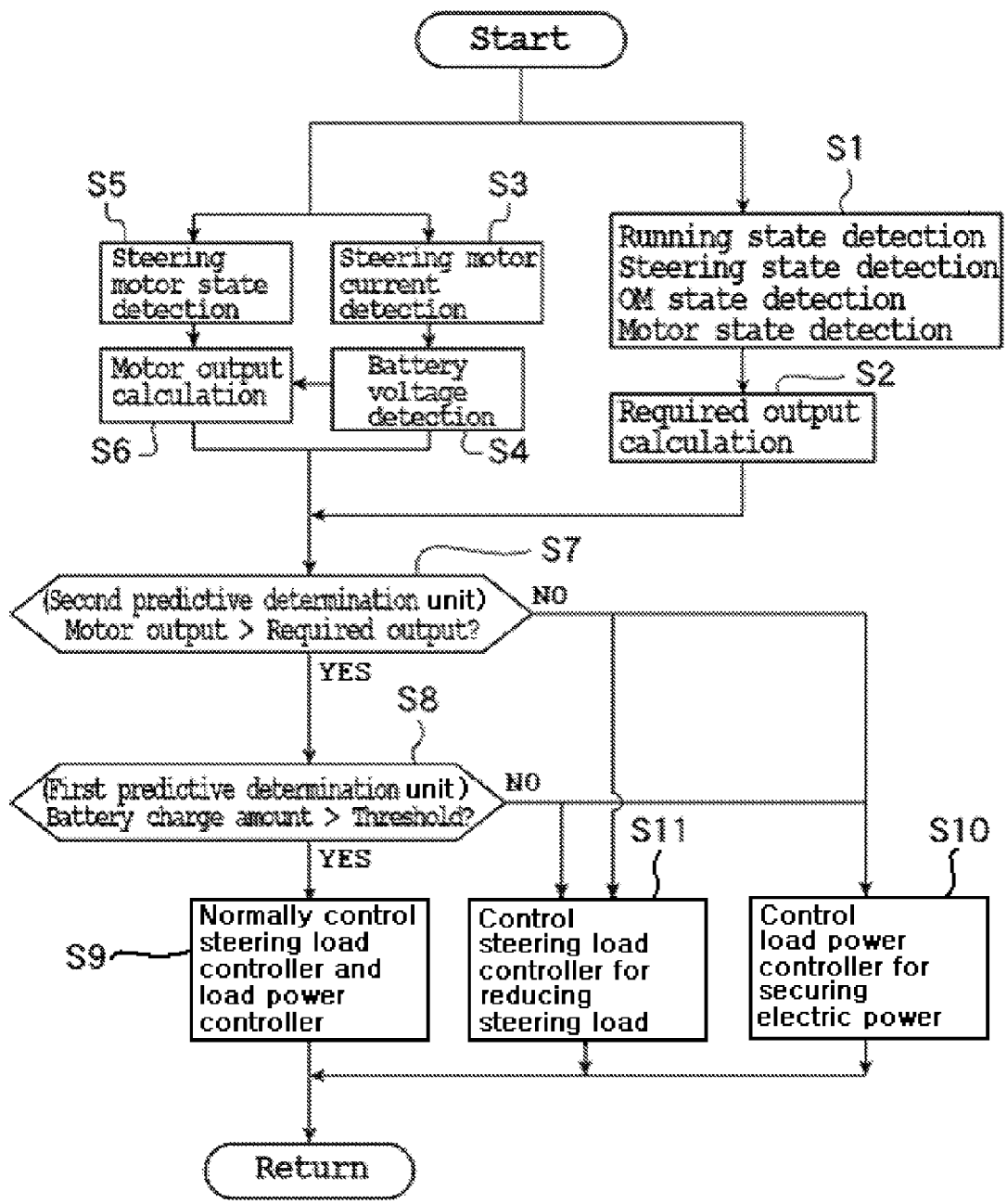
FIG. 3 is a flow chart showing a specific process of steering operation according to the first preferred embodiment of the present invention.

The normal steering drive controller 19 is arranged to control the steering motor 14 and so on, based on the steering operation on the boat propulsion device operating unit 13, more specifically, based on the respective control factors including the motor characteristics, for instance, of the steering load controller 18 and the load power controller 17, the amount of torque required to steer the outboard motor 12, when the motor output power exceeds the steering load and the battery charge amount is larger than the threshold representing the minimum charge amount required for running the boat (Step S9 in FIG. 3).

The steering load detector 20 is arranged to detect the states of respective control factors constituting the parameters of the steering load, and calculates the required output value. The steering load detector is arranged to determine the required output value by carrying out the calculation with a required output power calculating unit 20e based on the data obtained by one or more elements selected from: a steering state detector 20a, a boat running state detector 20b, an outboard motor state detector 20c, and a motor state detector 20d (Steps S1 and S2 in FIG. 3).

The steering state detector 20a senses the steering state by detecting the present state of the bearing angle, running speed, acceleration, and the steering wheel operation, respectively. The steering state detector 20a senses the steering state taking account of the detection signals from a steering angle sensor 31 provided in the vicinity of the outboard motor 12.

The boat running state detector 20b senses the running state by considering each state of the boat running speed and the engine speed values, acceleration, thrust, trim angle, weight, and the draft in a comprehensive manner.

The outboard motor state detector 20c senses the state of the outboard motor by considering the number of outboard motors installed, installation position, direction of propeller opening, propeller shape, tab-trim setting, transom height and width, and the application and the states of after-market anti-cavitation plate in a comprehensive manner.

The motor state detector 20d senses the state of the motor by considering each state of the responsiveness of the steering motor 14 dictated by the control error and the gain, the number of steering motors 14 driven, the temperature of the steering motor 14, temperature of motor driving circuit area, failure, locking, short-circuit, and the battery voltage in a comprehensive manner.

The motor output power detector 21 is arranged to determine the output power of the steering motor 14 by carrying out the calculation at an output power calculating unit 21g based on the data obtained by one or more elements selected from a steering motor power supply state detector 21a, a number of motors and motor driver temperature detector 21b, a battery voltage detector 21c, a steering motor current detector 21d, a control and gain detector 21e, and other electric apparatus state detector 21f (Steps S3 through S6 in FIG. 3).

On the other hand, the second predictive determination unit 23 is arranged to predict whether the steering output power is insufficient or not by comparing the steering load (required output value) detected and calculated by the steering load detector 20, with the output capability value detected and calculated by the motor output power detector 21 (Step S7 in FIG. 3).

When the second predictive determination unit 23 predicts the shortage of output power from the outboard motor, the second emergency controller 24 secures the electric power used for the steering control by the steering motor 14 (increase the output capability value) by reducing the load power of the electric apparatus except for the electric power for the steering control by the steering motor 14 via the load power controller 17, and at the same time, the second emergency controller 24 reduces the steering load of the outboard motor 12 (reduce the required output value from the present output value) via the steering load controller 18 (Steps S10 and S11 in FIG. 3).

More specifically, the second emergency controller 24 performs a control to decrease the load power of various electric apparatus including the engine starter (not shown), tab-trim 28, and the engine driven generator (not shown), via the load power controller 17. At the same time, the second emergency controller 24 performs control to make the steering load of the outboard motor 12 smaller than the motor output power, by taking respective measures through the steering load controller 18, including trim-up control by the trimming control section 18a, running speed and engine speed reduction control by the boat running speed and engine speed control section 18b, steering angle limit and reaction force enhancement control by the steering angle limitation and reaction force control section 18c, response level drop and gain modification control by the response level and gain control section 18e, and warning mismatch correction for the transom height, after-market anti-cavitation plate, tab-trim setting and so on by the warning mismatch correction section 18e.

The first predictive determination unit 25 is arranged to predict whether the battery charge amount continues to be smaller than the threshold, when the second predictive determination unit 23 determines that there is no shortage of outboard motor output power (Step S8 in FIG. 3).

When the first predictive determination unit 25 predicts the battery charge amount to be smaller than the threshold, the first emergency controller 26 secures the electric power used for the steering control by the steering motor 14 (increase the output capability value) by decreasing the load power of the electric apparatus except for the electric power used for the steering control by the steering motor 14 via the load power controller 17, and at the same time, the first emergency controller 26 reduces the steering load of the outboard motor 12 (the required output value is reduced from the present output value) via the steering load controller 18, similar to the aforementioned description (Steps S10 and S11 in FIG. 3).

Next, the operation process will be described based on a flow chart shown in FIG. 3.

First, the boat running state detection, the steering state detection, the outboard motor state (OM state) detection, and the motor state detection are performed by the steering load detector 20 (Step S1), and then, the required output value for carrying out the steering (steering load) is calculated based on each detection signal (Step S2). Also, the electric current of the steering motor 14 and the battery voltage are detected (Steps S3 and S4), and at the same time, the state of the steering motor 14 is detected (Step S5) by the motor output power detector 21. Then, the motor output power is calculated based on these detection results (Step S6).

Next, the motor output power and the steering load calculated in the preceding steps are input into the second predictive determination unit 23. The second predictive determination unit 23 compares and determines if the motor output power is larger than the steering load (Step S7). The determination of "YES" is made when the motor output power is larger than the steering load. In such case, comparison is made to determine if the battery charge amount calculated by the aforementioned battery voltage detection (Step S4) is larger than the threshold representing the minimum charge amount required for running the boat (Step S8). The determination of "YES" is made if the battery charge amount is larger than the threshold. In such a case, the normal steering drive controller 19 performs normal control for the load power controller 17 and for the steering load controller (Step S9).

In other words, when the motor output power exceeds the steering load and the battery charge amount is larger than the threshold representing the minimum charge amount required for running the boat, the normal steering drive control is performed based on the steering operation with the boat propulsion device operating unit 13, applying an amount of motor output power that is larger than the required steering load calculated by the steering load detector 20.

If the determination in Step S7 described above finds that the steering load is larger than the motor output power, the determination of "NO" is made. Then, control is performed such that the electric power used for the steering load control is secured by decreasing the load power of the electric apparatus except for the electric power used for the steering control via the load power controller 17 (Step S10), and at the same time, the steering load is decreased via the steering load controller 18 (Step S11).

Figure 4:
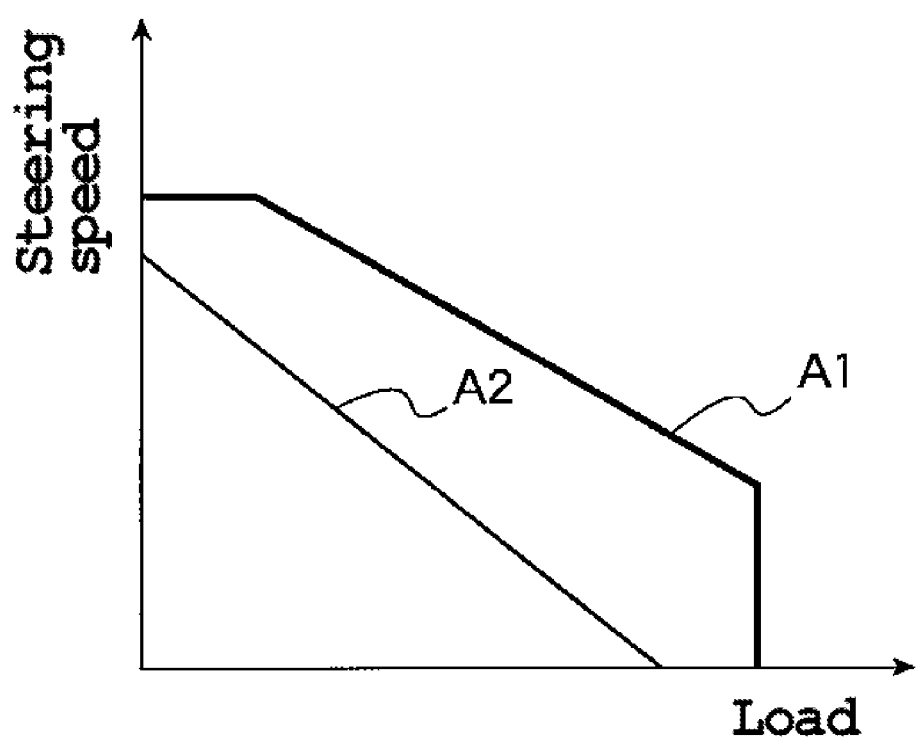
FIG. 4 is a chart showing the relationship between the steering speed and the load according to the first preferred embodiment of the present invention.

By the way, as shown in FIG. 4, there is a case in which an established performance characteristics line A1 changes into a characteristics line A2 with degraded performance due to the low charge voltage and so on, and the output capability value on the characteristics line A2 becomes smaller than the required output value (when determination of "NO" is made in Step S7). In such case, however, output capability value can be increased to exceed the required output value by securing the electric power using the load power controller 17 and so on.

If the determination in Step S8 described above determines that the battery charge amount is smaller than the threshold, the determination of "NO" is made, and the process goes to Step S10 and Step S11 to perform the control as described above.

Figure 5:
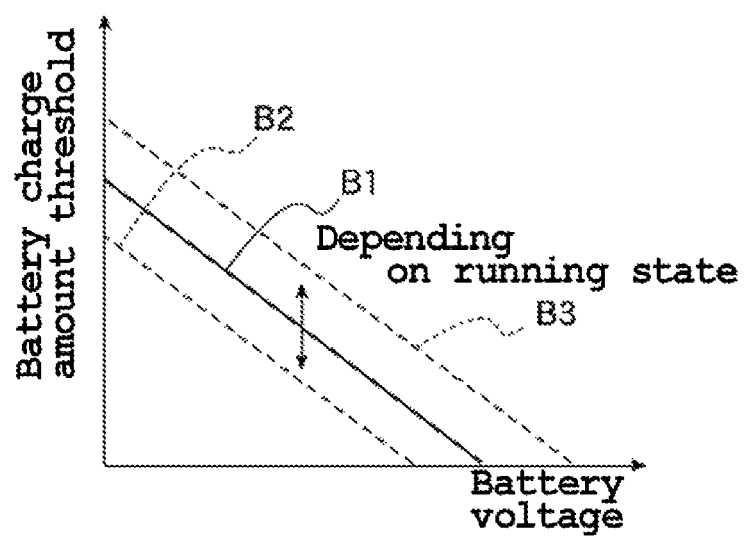
FIG. 5 is a chart showing the relationship between the reference current and the battery voltage according to the first preferred embodiment of the present invention.

By the way, as shown in FIG. 5, there is a case in which a characteristics line B1 shown by a solid line in FIG. 5 changes into a characteristics line of B2 or B3 shown by a dotted line due to the changes in the running states, and the battery charge amount may become smaller than the threshold. In such a case, however, the steering force can be secured by controlling the steering load to decrease using the steering load controller 18 and so on.

According to this preferred embodiment, the steering load detected by the steering load detector 20 is compared with the motor output power detected by the motor output power detector 21 for the determination. Thus, when the motor output power to carry out the steering is smaller than the steering load due to the low battery charge amount or other contributing factors, sufficient motor output power can be secured and good steering control can be achieved while continuously securing the propulsion force, by performing the control via the load power controller 17 and the steering load controller 18.

In addition, when the battery charge amount becomes smaller than the threshold, control via the load power controller 17 and the steering load controller 18 is performed to achieve good steering control, similar to the case described above.

Further, the required output power of the steering motor 14 for performing the steering operation is calculated appropriately, since the required output power is calculated based on any one of the detected boat running state, the steering state, the outboard motor state, and the motor driving state. The appropriate control corresponding to the battery charge state is achieved, since the control corresponding to the charge amount is determined by comparing the threshold current value established relative to the battery voltage with the actual current or with the predicted working current.

In addition, the steering load is reduced effectively, since the steering load controller 18 controls any one of the trimming, engine speed, steering angle, steering reaction force, and motor driving power supply.

Still further, the motor output power is secured more appropriately to achieve good steering control while continuously securing the propulsion force, since the load power controller 17 is configured to control for increasing the electric power supply to the steering motor from the present output value and increasing the output capability value, by controlling at least any one of the number of outboard motor engines driven, the driving of the tab-trim 28, the driving of the engine starter, the engine speed, the number of batteries connected, and the number of generators driven.

Second Preferred Embodiment

Figure 6:
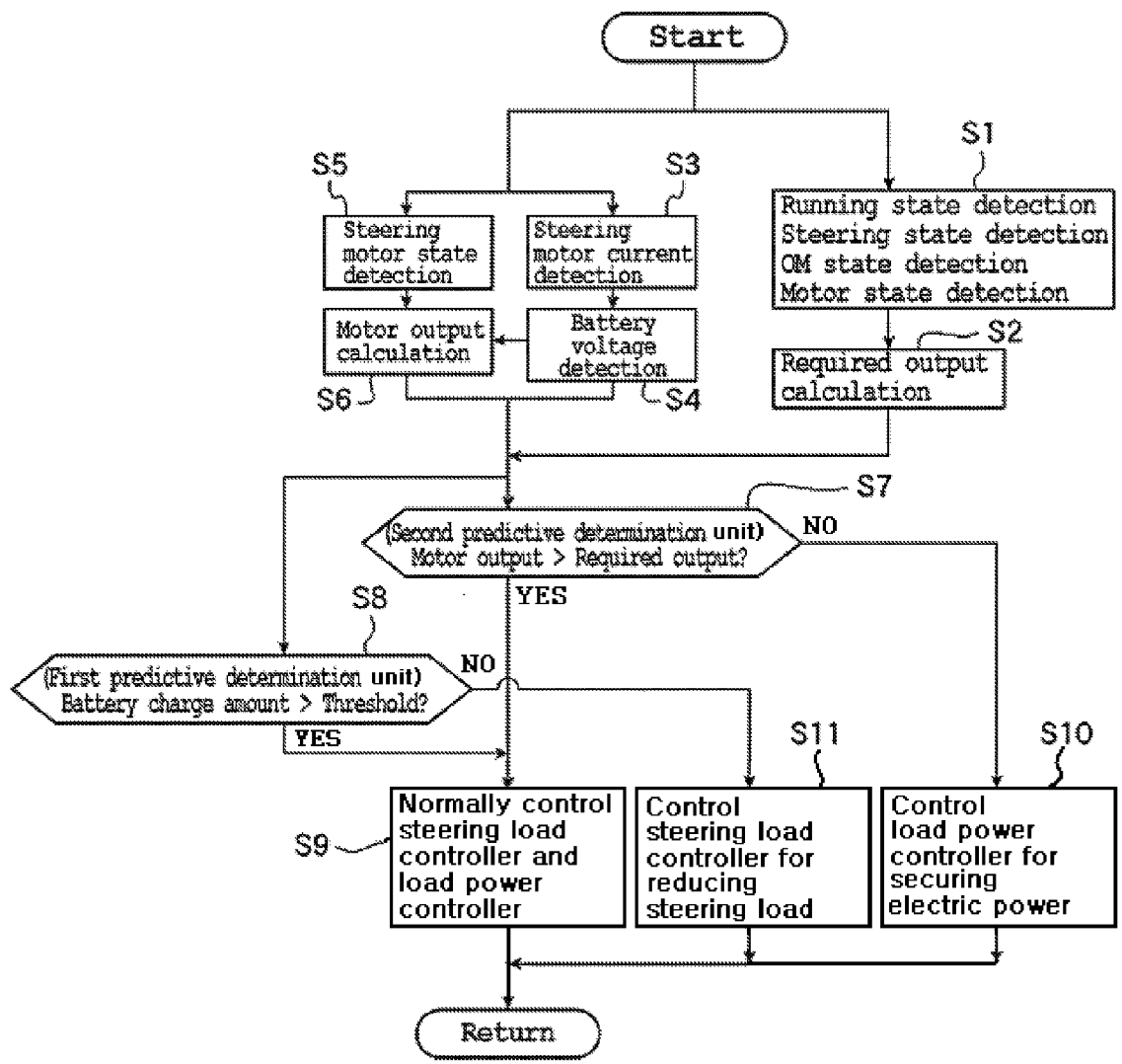
FIG. 6 is a flow chart equivalent to FIG. 3 for a second preferred embodiment of the present invention.

FIG. 6 shows the second preferred embodiment according to the present invention.

The second preferred embodiment uses a control method that is different from the first preferred embodiment.

Specifically, in the second preferred embodiment, Steps S7 and S8 shown in FIG. 3 for the first preferred embodiment are placed in parallel. Also, when the determination is "NO" in Step S7, the process goes to Step S10 to increase the charge amount for securing the electric power, or to reduce the load to secure the motor output power, as is the case with the first preferred embodiment. When the determination is "YES" in Step S7, the process goes to Step S9 to perform the control similar to the first preferred embodiment.

When the determination is "NO" in Step S8, the process goes to Step S11, and similar to the first preferred embodiment, the running is restricted to decrease the steering load. When the determination is "YES" in Step S8, the process goes to Step S9 to perform the control similar to the first preferred embodiment of the present invention.

This method also reliably provides motor output power that achieves good steering control while continuously securing the propulsion force.

Descriptions of other configurations and operational processes are skipped, since they are preferably the same as the case of the first preferred embodiment of the present invention.

The aforementioned preferred embodiments represent an example of the present invention, and they are not presented to limit the present invention to the preferred embodiments described above.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A boat comprising:
a hull;
a boat propulsion device rotatably disposed on the hull;
a boat propulsion device operating unit provided on the hull and arranged to be steered by an operator;
a steering motor arranged to steer the boat propulsion device according to a steering operation of the boat propulsion device operating unit;
a motor output power detector arranged to detect an output capability value that the steering motor can generate; and
a signal cable arranged to electrically connect the steering motor with the boat propulsion device operating unit;
a steering load detector arranged to calculate a required output value of the steering motor necessary to steer the boat propulsion device while the boat is in operation, the required output value necessary to steer the boat propulsion device being based on at least one of a boat running state, a steering state, a state of the boat propulsion device, and a driving state of the steering motor;
an output predictive determination unit arranged to compare the required output value from the steering load detector with the output capability value from the motor output power detector;
a charge amount predictive determination unit arranged to compare an actual charge amount of a battery supplying an electric power to the steering motor or a predicted charge amount of the battery calculated from a predicted working current, with a threshold; and
a steering load controller arranged to control the required output value to be lower than a present output value and reduce a steering load on the boat propulsion device when the charge amount predictive determination unit determines that the threshold is larger than the charge amount of the battery.

2. The boat according to claim 1, further comprising:
a load power controller arranged to reduce a power load on the battery when the output predictive determination unit determines that the required output value is larger than the output capability value.

3. The boat according to claim 1, wherein the motor output power detector is configured to detect the output capability value based on at least one of a battery voltage, a battery current, a temperature of the steering motor, a failure state of the steering motor, and a number of boat propulsion devices being driven.

4. The boat according to claim 1, wherein the steering load controller is arranged to perform control to reduce the required output value from the present output value by controlling at least one of a trim angle, an engine speed, a steering angle, and a steering reaction force.

5. The boat according to claim 1, wherein the load power controller is arranged to control at least one of a number of boat propulsion devices being driven, driving of a trim motor, driving of an engine starter, engine speed, a number of batteries connected, and a number of generators being driven, to increase the output capability value by increasing the electric power supplied to the steering motor.

6. The boat according to claim 1, wherein the load power controller is configured to increase the output capability value by reducing the load on the battery while increasing the electric power supplied to the steering motor.

7. A boat comprising:
a hull;
a boat propulsion device rotatably disposed on the hull;
a boat propulsion device operating unit provided on the hull and arranged to be steered by an operator;
a steering motor arranged to steer the boat propulsion device according to a steering operation of the boat propulsion device operating unit;
a motor output power detector arranged to detect an output capability value that the steering motor can generate; and
a signal cable arranged to electrically connect the steering motor with the boat propulsion device operating unit;
a steering load detector arranged to calculate a required output value of the steering motor necessary to steer the boat propulsion device while the boat is in operation, the required output value necessary to steer the boat propulsion device being based on at least one of a boat running state, a steering state, a state of the boat propulsion device, and a driving state of the steering motor;
an output predictive determination unit arranged to compare the required output value from the steering load detector with the output capability value from the motor output power detector;
a charge amount predictive determination unit arranged to compare an actual charge amount of a battery supplying an electric power to the steering motor or a predicted charge amount of the battery calculated from a predicted working current, with a threshold; and
a load power controller arranged to perform control to reduce a power load on the battery and increase the electric power supplied to the steering motor when the output predictive determination unit determines that the required output value is larger than the output capability value.

8. The boat according to claim 7, further comprising:
a steering load controller arranged to control the required output value to be lower than a present output value and reduce a steering load on the boat propulsion device when the charge amount predictive determination unit determines that the threshold is larger than the charge amount of the battery.

9. The boat according to claim 7, wherein the motor output power detector is configured to detect the output capability value based on at least one of a battery voltage, a battery current, a temperature of the steering motor, a failure state of the steering motor, and a number of boat propulsion devices being driven.

10. The boat according to claim 8, wherein the steering load controller is arranged to perform control to reduce the required output value from the present output value by controlling at least one of a trim angle, an engine speed, a steering angle, and a steering reaction force.

11. The boat according to claim 7, wherein the load power controller is arranged to control at least one of a number of boat propulsion devices being driven, driving of a trim motor, driving of an engine starter, engine speed, a number of batteries connected, and a number of generators being driven, to increase the output capability value.

12. The boat according to claim 7, wherein the load power controller is configured to increase the output capability value by reducing the load on the battery.

* * * * *